(12) United States Patent
Corral-Soto et al.

(10) Patent No.: US 10,915,793 B2
(45) Date of Patent: Feb. 9, 2021

(54) METHOD AND SYSTEM FOR CONVERTING POINT CLOUD DATA FOR USE WITH 2D CONVOLUTIONAL NEURAL NETWORKS

(71) Applicants: Eduardo R. Corral-Soto, Toronto (CA); Ehsan Nezhadarya, Thornhill (CA); Bingbing Liu, Singapore (SG)

(72) Inventors: Eduardo R. Corral-Soto, Toronto (CA); Ehsan Nezhadarya, Thornhill (CA); Bingbing Liu, Singapore (SG)

(73) Assignee: Huawei Technologies Co., Ltd., Shenzhen (CN)

( * ) Notice: Subject to any disclaimer, the term of this patent is extended or adjusted under 35 U.S.C. 154(b) by 145 days.

(21) Appl. No.: 16/184,570

(22) Filed: Nov. 8, 2018

(65) Prior Publication Data
US 2020/0151512 A1 May 14, 2020

(51) Int. Cl.
*G06K 9/62* (2006.01)

(52) U.S. Cl.
CPC .......... *G06K 9/6262* (2013.01); *G06K 9/627* (2013.01)

(58) Field of Classification Search
CPC ............................. G06K 9/6262; G06K 9/627
See application file for complete search history.

(56) References Cited

U.S. PATENT DOCUMENTS

| | | | | |
|---|---|---|---|---|
| 8,300,574 B2* | 10/2012 | Ding | | H04J 11/0033 370/203 |
| 10,269,125 B1* | 4/2019 | Kim | | G06T 7/248 |
| 10,282,852 B1* | 5/2019 | Buibas | | G06T 7/246 |
| 10,368,062 B2* | 7/2019 | Briggs | | G06K 9/6256 |
| 10,387,752 B1* | 8/2019 | Kim | | G06K 9/6257 |
| 10,671,855 B2* | 6/2020 | Lee | | G06K 9/00765 |
| 2013/0057653 A1 | 3/2013 | Park et al. | | |
| 2015/0347846 A1* | 12/2015 | Guzm N-Rivera | | G06K 9/6256 382/103 |
| 2018/0240241 A1* | 8/2018 | Armstrong | | G06T 7/564 |
| 2018/0268601 A1* | 9/2018 | Rad | | G06K 9/00208 |
| 2018/0270474 A1* | 9/2018 | Liu | | A61B 6/508 |
| 2019/0042883 A1* | 2/2019 | Park | | G06K 9/4628 |

(Continued)

FOREIGN PATENT DOCUMENTS

| | | |
|---|---|---|
| CN | 107392947 A | 11/2017 |
| CN | 108198145 A | 6/2018 |
| WO | 2018156224 A1 | 8/2018 |

OTHER PUBLICATIONS

Jiang, Cansen et al. High Quality Reconstruction of Dynamic Objects using 2D-3D Camera Fusion, 2017 IEEE International Conference on Image Processing (ICIP), Sep. 20, 2017, total 6 pages.

(Continued)

*Primary Examiner* — Mia M Thomas

(57) ABSTRACT

Methods and systems for encoding 3D data for use with 2D convolutional neural networks (CNNs) are described. A set of 3D data is encoded into a set of one or more arrays. A 2D index of the arrays is calculated by projecting 3D coordinates of the 3D point onto a 2D image plane that is defined by a set of defined virtual camera parameters. The virtual camera parameters include a camera projection matrix defining the 2D image plane. Each 3D coordinate of the point is stored in the arrays at the calculated 2D index. The set of encoded arrays is provided for input to a 2D CNN, for training or inference.

21 Claims, 8 Drawing Sheets

(56) References Cited

U.S. PATENT DOCUMENTS

| | | | |
|---|---|---|---|
| 2019/0096086 A1* | 3/2019 | Xu | G06T 7/73 |
| 2019/0130219 A1* | 5/2019 | Shreve | G06K 9/6257 |
| 2019/0206071 A1 | 7/2019 | Yan et al. | |
| 2019/0311494 A1* | 10/2019 | Ramalingam | G06K 9/00785 |
| 2019/0340435 A1* | 11/2019 | Rabinovich | G06N 3/0454 |
| 2020/0019921 A1* | 1/2020 | Buibas | G01G 19/4144 |
| 2020/0025931 A1* | 1/2020 | Liang | G06N 3/08 |
| 2020/0082168 A1* | 3/2020 | Fathi | B64C 39/024 |

OTHER PUBLICATIONS

Charles R. Qi et al., "Frustum PointNets for 3D Object Detection from RGB-D Data", arXiv preprint arXiv:1711.08488, 10 pages in total.

Jason Ku et al., "Joint 3D Proposal Generation and Object Detection from View Aggregation", arXiv:1712.02294v4 [cs.CV] Jul. 12, 2018, 8 pages in total.

Jason Ku et al., "In Defense of Classical Image Processing: Fast Depth Completion on the CPU", arXiv:1802.00036v1 [cs.CV] Jan. 31, 2018, 7 pages in total.

Xiaozhi Chen et al., "Multi-View 3D Object Detection Network for Autonomous Driving", arXiv:1611.07759v3 [cs.CV] Jun 22, 2017, 9 pages in total.

Kaiming He et al., "Mask R-CNN", 2017 IEEE International Conference on Computer Vision, 9 pages in total.

Yin Zhou et al., "VoxelNet: End-to-End Learning for Point Cloud Based 3D Object Detection", arXiv preprint arXiv:1711.06396, 10 pages in total.

Charles R. Qi et al., "PointNet: Deep Learning on Point Sets for 3D Classification and Segmentation", IEEE Proc. Computer Vision and Pattern Recognition (CVPR), 9 pages in total.

Charles R. Qi et al., "PointNet++: Deep Hierarchical Feature Learning on Point Sets in a Metric Space", 31st conference on Neural Information Processing Systems (NIPS 2017), 10 pages in total.

Forrest N. Iandola et al. "SqueezeNet: AlexNet-Level Accuracy with 50X Fewer Parameters and <0.5MB Model Size", arXiv:1602.07360v4 [cs. CV] Nov. 4, 2016, 13 pages in total.

Bichen Wu et al., "SqueezeSeg: Convolutional Neural Nets with Recurrent CRF for Real-Time Road-Object Segmentation from 3D LiDAR Point Cloud", arXiv:1710.07368v1 [cs.CV] Oct. 19, 2017, 7 pages in total.

* cited by examiner

METHOD AND SYSTEM FOR CONVERTING POINT CLOUD DATA FOR USE WITH 2D CONVOLUTIONAL NEURAL NETWORKS

FIELD

The present disclosure relates to encoding 3D point cloud data as sets of 2D data arrays that may be suitable for use with 2D convolutional neural networks, for example to perform object detection, classification and segmentation.

BACKGROUND

An autonomous vehicle may use different sensors to sense its surrounding environment, may process the sensor data to generate a set of data points in space, and may use a computer vision system to process the set of data points in order to detect and identify objects of interest (e.g., pedestrians or other cars) in the surrounding environment. Sensors such as LIDARs and cameras, such as optical cameras, are often used in autonomous vehicles to sense objects in the surrounding environment of the vehicle. LIDARs and cameras have different characteristics and provide different advantages. For example, an optical camera senses objects in an environment, captures an image of the sensed objects, and generates 2D image data representative of a captured image. An optical camera, however, may fail at sensing objects under extreme illumination variations (e.g., at night, or in very bright environments) and may be limited to capturing two-dimensional (2D) images. However, an optical camera may be able to sense images of objects located at relatively large distances from the optical camera. A LIDAR may capture three-dimensional (3D) information about a surrounding environment and generate a set of data points in space that are representative of the captured 3D information. The set of data points in three-dimensional space is generally referred to in the art as a point cloud and is provided by the LIDAR as 3D data. Although a LIDAR may be able to capture 3D information over a broader region, a LIDAR may fail to detect small and/or narrow objects located far from the LIDAR and may have limited sensing resolution, particularly in the vertical direction. Accordingly, computer vision system may benefit from using both 3D data received from a LIDAR and 2D image received from a camera together.

Attempts have been made to use LIDAR and 2D image data together as input into computer vision systems and train such systems to learn to perform object detection, classification and segmentation. One computer vision system implements the Aggregate View Object Detection with Feature Pyramid Network (AVOD-FPN) algorithm, which performs feature extraction on 2D image data and LIDAR data separately, then performs early fusion of projectively-corresponding region-wise features that are used to perform object detection and classification. However, a computer vision system that implements the AVOD-FPN algorithm requires separately trained networks for each object class (e.g., one network trained for detecting cars, another network separately trained for detecting pedestrians) which in practice often requires multiple computational devices running in parallel to detect multiple object classes. In other computer vision systems, the Multi-View 3D (MV3D) algorithm projects LIDAR data onto a cylindrical surface, and the SqueezeSeg algorithm projects LIDAR data onto a spherical surface. However, the projection geometry in these algorithms may be difficult to use with existing convolutional neural networks (CNNs) that are designed for analyzing 2D planar images, and it may be difficult and expensive to spatially-register these projection geometries with 2D optical images. Highly accurate computer visions systems which include regional CN Ns (RCNNs) such as the Mask RCNN, have been developed for object detection, classification and segmentation on 2D, planar, RGB image data received from cameras.

It would be desirable to enable 3D point cloud data, to be analyzed using computer visions systems that include CN Ns designed for object detection, classification, and segmentation of 2D image data, such as 2D image data representative of 2D RGB images.

SUMMARY

The present disclosure provides methods and systems for encoding 3D point cloud data to a set of arrays (e.g., a set of three 2D arrays) that may be compatible with, and acceptable as input to, 2D CNNs, such as 2D Mask Regional CNNs (R-CNNs). The set of arrays may be combined with 2D image data (e.g., in the form of RGB arrays), and the combined data may be used for training and/or as input into a 2D CNN that performs 2D object detection, classification, regression, and segmentation. The set of arrays may also be used alone as training for and/or input to a 2D CNN. In some examples, 3D semantic segmentation and/or regression may be performed in addition to 2D object detection, classification, regression, and segmentation.

In some example aspects, the present disclosure describes a method that includes: receiving a set of 3D data in the form of a point cloud; and encoding the set of 3D data into a set of one or more arrays by, for each data point of the 3D data: calculating a 2D index of the one or more arrays by projecting 3D coordinates of the point onto a 2D image plane defined by a set of defined virtual camera parameters, the set of virtual camera parameters including a camera projection matrix defining the 2D image plane; and storing each 3D coordinate of the data point in the one or more arrays at the calculated 2D index. The method also includes outputting the set of one or more arrays for input to a 2D convolutional neural network (CNN) for training or inference.

In any of the preceding aspects/embodiments, the method may also include: adjusting the 3D data according to one or more predefined parameters to generate a set of adjusted 3D data. The adjusting may be at least one of: scaling, shifting, normalizing or quantizing the 3D coordinates. The set of one or more arrays may be generated from the adjusted 3D data.

In any of the preceding aspects/embodiments, the set of one or more arrays may contains value adjusted to be recognizable as image data.

In any of the preceding aspects/embodiments, the virtual camera parameters may include a definition of a region of interest (ROI). The method may also include: defining a subset of the 3D data corresponding to the ROI; and encoding the set of one or more arrays from the subset of the 3D data.

In any of the preceding aspects/embodiments, the method may also include filling in any holes in the set of one or more arrays using dilation.

In any of the preceding aspects/embodiments, the method may also include encoding the 3D data to a second set of one or more arrays, using a second set of virtual camera parameters defining a second 2D image plane.

In any of the preceding aspects/embodiments, the set of virtual camera parameters may correspond to parameters of an optical camera.

In any of the preceding aspects/embodiments, the method may also include: combining the set of one or more arrays with a set of 2D image data obtained by the optical camera, to generate a set of combined data; performing object detection using the set of combined data as input to the 2D CNN; and outputting a set of 2D object bounding boxes and a set of 2D object masks.

In any of the preceding aspects/embodiments, the combining may include: performing spatial registration between the set of one or more arrays and the set of 2D image data; and concatenating the set of one or more arrays with the set of 2D image data.

In some aspects, the present disclosure describes a method including receiving a set of 3D data in the form of a point cloud. The method also includes encoding the set of 3D data into a set of one or more arrays by, for each data point of the 3D data: calculating a 2D index of the one or more arrays by projecting 3D coordinates of the point onto a 2D image plane defined by a set of defined virtual camera parameters, the set of virtual camera parameters including a camera projection matrix defining the 2D image plane; and storing each 3D coordinate of the data point in the one or more arrays at the calculated 2D index. The method also includes performing object detection using the set of one or more arrays as input to a 2D convolutional neural network (CNN) configured to output a set of detected objects. The method also includes performing object classification, regression, and segmentation using the set of detected objects as input to a 2D segmentation and regression unit configured to label the set of detected object with classes of interest, and output a set of 2D object bounding boxes and a set of 2D object masks for the set of detected objects.

In any of the preceding aspects/embodiments, a mapping index may be stored to associate each calculated 2D index to the respective data point in the 3D data. The method may also include: performing a 3D semantic segmentation by associating each 2D object mask with a respective cluster of data points in the 3D data, using the mapping index; and outputting a set of 3D object masks.

In any of the preceding aspects/embodiments, the method may also include performing a 3D regression, using a 3D regression network that is trained to regress parameters of a 3D bounding boxes corresponding to a subset of the data points in the set of one or more arrays, to output a set of 3D object bounding boxes.

In some aspects, the present disclosure describes a processing unit configured to implement a data analysis system. The data analysis system is implemented to: receive a set of 3D data in the form of a point cloud; and encode the 3D data to a set of one or more arrays. The encoding is performed by, for each data point of the 3D data: calculating a 2D index of the one or more arrays by projecting 3D coordinates of the data point onto a 2D image plane defined by a set of defined virtual camera parameters, the set of virtual camera parameters including a camera projection matrix defining the 2D image plane; and storing each 3D coordinate of the data point in the one or more arrays at the calculated 2D index. The data analysis system is also implemented to: output the set of one or more arrays for input to a 2D convolutional neural network (CNN) of the data analysis system, for training or inference.

In any of the preceding aspects/embodiments, the processing unit may be further configured to implement the data analysis system to: adjust the 3D data according to one or more predefined parameters to generate a set of adjusted 3D data. The 3D data may be adjusted by performing at least one of: scaling, shifting, normalizing or quantizing the 3D coordinates. The set of one or more arrays may be generated from the adjusted 3D data.

In any of the preceding aspects/embodiments, the adjusted 3D data may contain values adjusted to be recognizable as image data.

In any of the preceding aspects/embodiments, the virtual camera parameters may include a definition of a region of interest (ROI). The processing unit may be further configured to implement the data analysis system to: define a subset of the 3D data corresponding to the ROI; and encode the set of one or more arrays from the subset of the 3D data.

In any of the preceding aspects/embodiments, the processing unit may be further configured to implement the data analysis system to fill in any holes in the set of one or more arrays using dilation.

In any of the preceding aspects/embodiments, the processing unit may be further configured to implement the data analysis system to: encode the 3D data to a second set of one or more arrays, using a second set of virtual camera parameters defining a second 2D image plane.

In any of the preceding aspects/embodiments, the processing unit may be further configured to implement the data analysis system to: perform object detection using the set of one or more arrays as input to the 2D CNN; and output a set of 2D object bounding boxes and a set of 2D object masks.

In any of the preceding aspects/embodiments, a mapping index may be stored to map each calculated 2D index to the respective point in the 3D data. The processing unit may be further configured to implement the data analysis system to: perform a 3D semantic segmentation by associating each 2D object mask with a respective cluster of points in the 3D data, using the mapping index; and output a set of 3D object masks.

In any of the preceding aspects/embodiments, the processing unit may be further configured to implement the data analysis system to: perform a 3D regression, using a 3D regression network that is trained to regress parameters of a 3D bounding box corresponding to a subset of the data points in the set of one or more arrays, to output a set of 3D object bounding boxes.

In any of the preceding aspects/embodiments, the set of virtual camera parameters may correspond to parameters of the optical camera.

In any of the preceding aspects/embodiments, the processing unit may be further configured to implement the data analysis system to: combine the set of one or more arrays with a set of 2D image data obtained by the optical camera, to generate a set of combined data; perform object detection using the set of combined data as input to the 2D CNN; and output a set of 2D object bounding boxes and a set of 2D object masks.

In any of the preceding aspects/embodiments, the processing unit may be further configured to implement the data analysis system to performing the combining by: performing spatial registration between the set of one or more arrays and the set of 2D image data; and concatenating the set of one or more arrays with the set of 2D image data.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Some examples of the present disclosure are described in the context of autonomous vehicles. However, the methods and systems disclosed herein may also be suitable for implementation outside of autonomous devices, for example in non-vehicular devices, and non-autonomous devices. For example, any system or device that performs object detection, classification and/or segmentation on captured 2D and 3D data may benefit from the examples described here. Further, examples of the present disclosure may be implemented in image processing devices, such as workstations or other computing devices not related to autonomous machines (e.g., image processing workstations for analyzing radar data or ultrasound data).

Although examples described herein refer to a car as the autonomous vehicle, the teachings of the present disclosure may be implemented in other forms of autonomous or semi-autonomous vehicles including, for example, trams, subways, trucks, buses, watercraft, aircraft, ships, drones (also called unmanned aerial vehicles (UAVs)), warehouse equipment, construction equipment or farm equipment, and may include vehicles that do not carry passengers as well as vehicles that do carry passengers. The methods and systems disclosed herein may also be suitable for implementation in non-vehicular devices, for example autonomous vacuum cleaners and lawn mowers.

Figure 1:
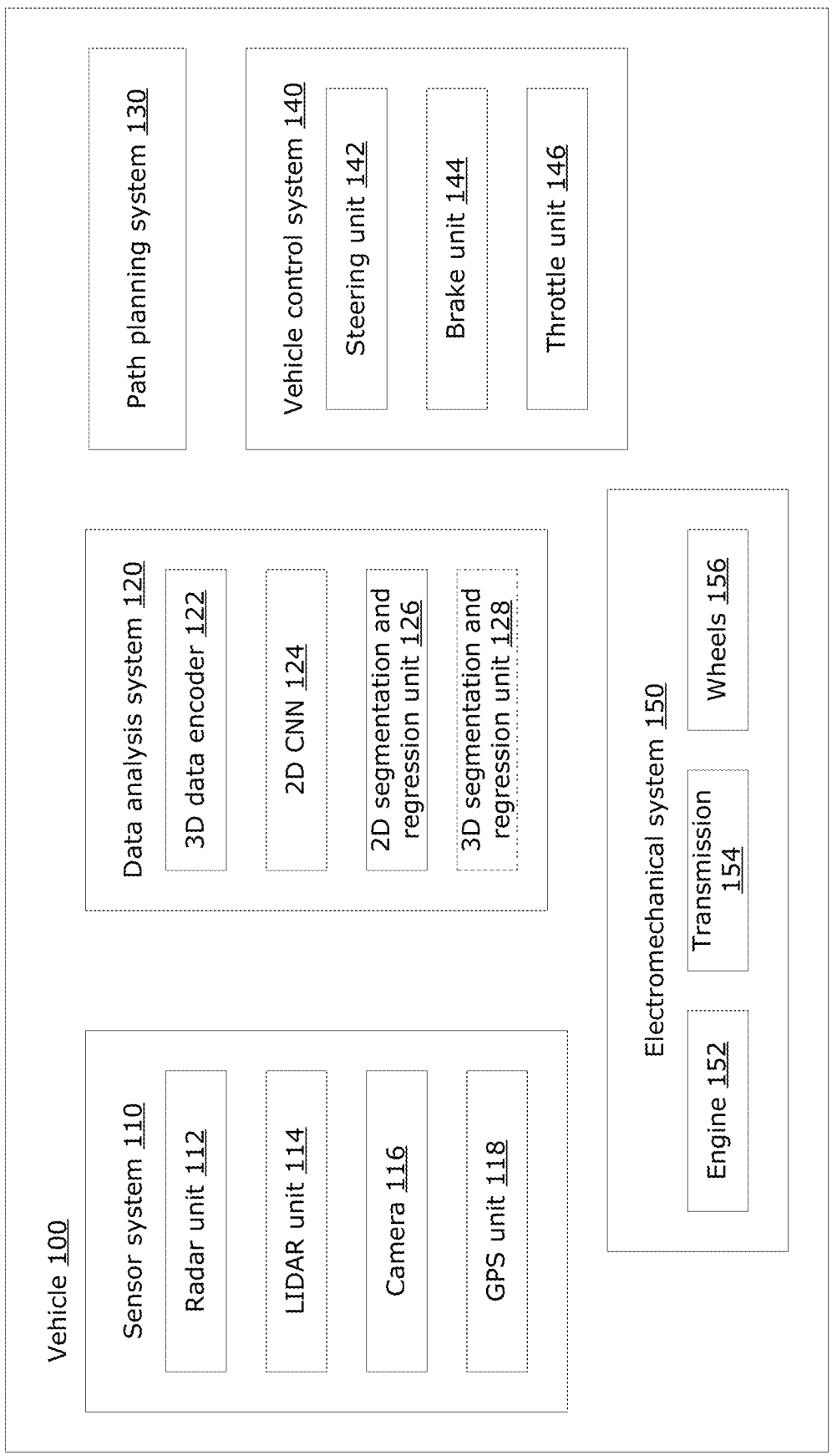
FIG. 1 is a block diagram illustrating some components of an example autonomous vehicle.

FIG. 1 is a block diagram illustrating certain components of an example autonomous vehicle 100. Although described as being autonomous, the vehicle 100 may be operable in a fully-autonomous, semi-autonomous or fully user-controlled mode. In the present disclosure, the vehicle 100 is described in the embodiment of a car, however the present disclosure may be implemented in other vehicular or non-vehicular machines, as discussed above.

The vehicle 100 includes a sensor system 110, a data analysis system 120, a path planning system 130, a vehicle control system 140 and an electromechanical system 150, for example. Other systems and components may be included in the vehicle 100 as appropriate. Various systems and components of the vehicle may communicate with each other, for example through wired or wireless communication. For example, the sensor system 110 may communicate with the data analysis system 120, path planning system 130 and the vehicle control system 140; the data analysis system 120 may communicate with the path planning system 130 and the vehicle control system 140; the path planning system 130 may communicate with the vehicle control system 140; and the vehicle control system 140 may communicate with the mechanical system 150.

The sensor system 110 includes various sensing units for collecting information about the internal and/or external environment of the vehicle 100. In the example shown, the sensor system 110 includes a radar unit 112, a LIDAR unit 114, a camera unit 116 and a global positioning system (GPS) unit 118 for collecting information about the external environment of the vehicle. The sensor system 110 may include other sensing units, such as a temperature sensor, precipitation sensor or microphone, among other possibilities.

The camera unit 116 may capture static images and/or a video comprising a set of images, for example and generate image data representative of the captured static image and/or the images of the video. The image data may be two-dimensional (2D) image data, which may be encoded in the form of three 2D arrays encoding the red, green and blue (RGB) intensity values, respectively, of the captured 2D image, in a particular field-of-view (FOV). The three 2D arrays each have the same height and width dimensions (e.g., h×w), and the intensity value at each array element represents the RGB values of a corresponding pixel in the captured 2D image. Although described herein as a set of three 2D arrays, the 2D image data may alternatively be encoded in a 3D array having the same height and width dimensions, and a depth of 3 (e.g., h×w×3), where each depth corresponds to one of red, green or blue intensity values. It should be understood that even where the 2D image data is encoded in the form of a 3-deep 3D array, the data encoded therein is 2D data that does not capture depth information (i.e., the "depth" of such a 3D array corresponds to each of the red, green and blue intensity values, not to actual depth).

The LIDAR unit 114 may capture information in a wide view (e.g., 360° view) about the vehicle 100. The LIDAR unit 114 may capture three-dimensional (3D) information about the external environment, and may be encoded in the form of a set of data points in 3D space (e.g., a 3D point cloud) and provided as 3D data, where each data point in the 3D data represents the 3D coordinates (e.g., x, y and z values in meters) of a sensed object in the 3D space (e.g. the point of origin from which light is reflected from the object). The data points in a 3D point cloud may be irregularly spaced, depending on the external environment. In some examples, in addition to 3D coordinates, each data point in the 3D data may also contain other information, such as intensity of reflected light or time of detection.

Using the various sensing units 112, 114, 116, 118, the sensor system 110 may collect information about the local external environment of the vehicle 100 (e.g., any immediately surrounding obstacles) as well as information from a wider vicinity (e.g., the radar unit 112 and LIDAR unit 114 may collect information from an area of up to 100 m radius or more around the vehicle 100). The sensor system 110 may also collect information about the position and orientation of the vehicle 100 relative to a frame of reference (e.g., using the GPS unit 118). The sensor system 110 may further collect information about the vehicle 100 itself. In such a case, the vehicle 100 may itself be considered part of the sensed environment. For example, the sensor system 110 may collect information from sensing units (e.g., accelerometers, speedometer, odometer and/or inertial measurement unit), which may or may not be part of the sensor system 110, to determine the state of the vehicle 100, such as linear speed, angular speed, acceleration and tire grip of the vehicle 100. The sensor system 110 may repeatedly (e.g., in regular intervals) receive information from its sensing units in real-time. The sensor system 110 may in turn provide sensor data in real-time or near real-time to other components of the vehicle 100.

The sensor system 110 communicates with the data analysis system 120 to provide sensor data, including 2D image data and 3D data to the data analysis system 120 which is configured to detect and identify objects in the external environment, for example to detect and identify a pedestrian or another car. The data analysis system 120 may be any suitable computer vision system that implements machine learning algorithms to detect and identify objects in the external environment, for example to detect and identify a pedestrian or another car. The data analysis system 120 in this example includes a 3D data encoder 122, a 2D CNN 124, a 2D segmentation and regression unit 126, and an optional 3D segmentation and regression unit 128. The data analysis system 120 may be implemented using software, which may include any number of independent or interconnected modules or functions, for example to implement any suitable machine learning algorithms and CNNs. For example, although illustrated as separate blocks in FIG. 1, the 3D data encoder 122, 2D CNN 124, the 2D segmentation and regression unit 126 and the 3D segmentation and regression unit 128 may be implemented as part of an overall object detection function of the data analysis system 120. Details of the objection detection will be discussed further below. The software of the data analysis system 120 may be executed using a dedicated image processing unit, or may be executing using one or more general processing units of a vehicle controller (not shown) of the vehicle 100. The data analysis system 120 may repeatedly (e.g., in regular intervals) receive sensor data from the sensor system 110 and perform object detection and identification in real-time or near real-time. The output of the data analysis system 120 may include, for example data identifying objects, including object class, object location and object boundary, in 2D and optionally in 3D space.

Although the example embodiment of the data analysis unit 120 shown in FIG. 1 describes the 3D regression and segmentation unit as being optional, in alternative embodiments, the data analysis system 120 includes each of the 3D data encoder 122, a 2D CNN 124, a 2D segmentation and regression unit 126, and the 3D segmentation and regression unit 128.

Sensor data from the sensor system 110 and output from the data analysis system 120 may be provided to the path planning system 130. The path planning system 130 carries out path planning for the vehicle 100. For example, the path planning system 130 may plan a path for the vehicle 100 to travel from a starting point to a target destination, using information from the GPS unit 118. The path planning system 130 may be implemented as one or more software modules or control blocks carried out by one or more processing units in the vehicle 100. In some examples, the path planning system 130 may perform path planning at different levels of detail, for example on a mission planning level, on a behavior planning level, and on a motion planning level. The output from the path planning system 130 may include data defining one or more planned paths for the vehicle 100 to travel. The path planning carried out by the path planning system 130 is performed in real-time or near real-time, to enable the vehicle 100 to be responsive to real-time changes in the sensed environment. Output from the path planning system 130 may be provided to the vehicle control system 140.

The vehicle control system 140 serves to control operation of the vehicle 100. The vehicle control system 140 may be used to provide full, partial or assistive control of the vehicle 100. The vehicle control system 140 may serve to fully or partially control operation of the electromechanical system 150, when the vehicle 100 is operating autonomously or semi-autonomously, based on the planned path from the path planning system 130. Data received from the sensor system 110 and/or the data analysis system 120 may also be used by the vehicle control system 140. In this example, the vehicle control unit 140 includes a steering unit 142, a brake unit 144 and a throttle unit 146. Each of these units 142, 144, 146 may be implemented as separate or integrated software modules or control blocks within the vehicle control system 140. The units 142, 144, 146 generate control signals to control the steering, braking and throttle, respectively, of the vehicle 100. The vehicle control system 140 may include additional components to control other aspects of the vehicle 100 including, for example, control of turn signals and brake lights.

The electromechanical system 150 receives control signals from the vehicle control system 140 to operate the mechanical components of the vehicle 100. The mechanical system 150 effects physical operation of the vehicle 100. In the example shown, the electromechanical system 150 includes an engine 152, a transmission 154 and wheels 156. The engine 152 may be a gasoline-powered engine, an electricity-powered engine, or a gasoline/electricity hybrid engine, for example. Other components may be included in the electromechanical system 150, including, for example, turn signals, brake lights, fans and windows.

The vehicle 100 may include other components that are not shown, including, for example, a user interface system and a wireless communication system (e.g., including an antenna). These other components may also provide input to and/or receive output from the above-described systems. The vehicle 100 may communicate with an external system, for example an external map database. The vehicle 100 may also communicate with a network, for example a vehicle network that enables communication among autonomous, semi-autonomous or non-autonomous vehicles.

The sensor system 110, data analysis system 120, path planning system 130 and the vehicle control system 140 may be individually or in combination be realized, at least in part, in one or more processing units of the vehicle 100. For example, the vehicle 100 may include a processing unit having one or more physical processors (e.g., a microprocessor, microcontroller, digital signal processor, field programmable gate array, or application specific integrated circuit) coupled to one or more tangible memories (not shown). A processing unit may also be referred to as a computing unit or a controller. The memory(ies) may store instructions, data and/or software modules for execution by the processing unit(s) to carry out the functions of the systems described herein. The memory(ies) may store other software instructions and data for implementing other operations of the vehicle 100. Each memory may include any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

Figure 2:
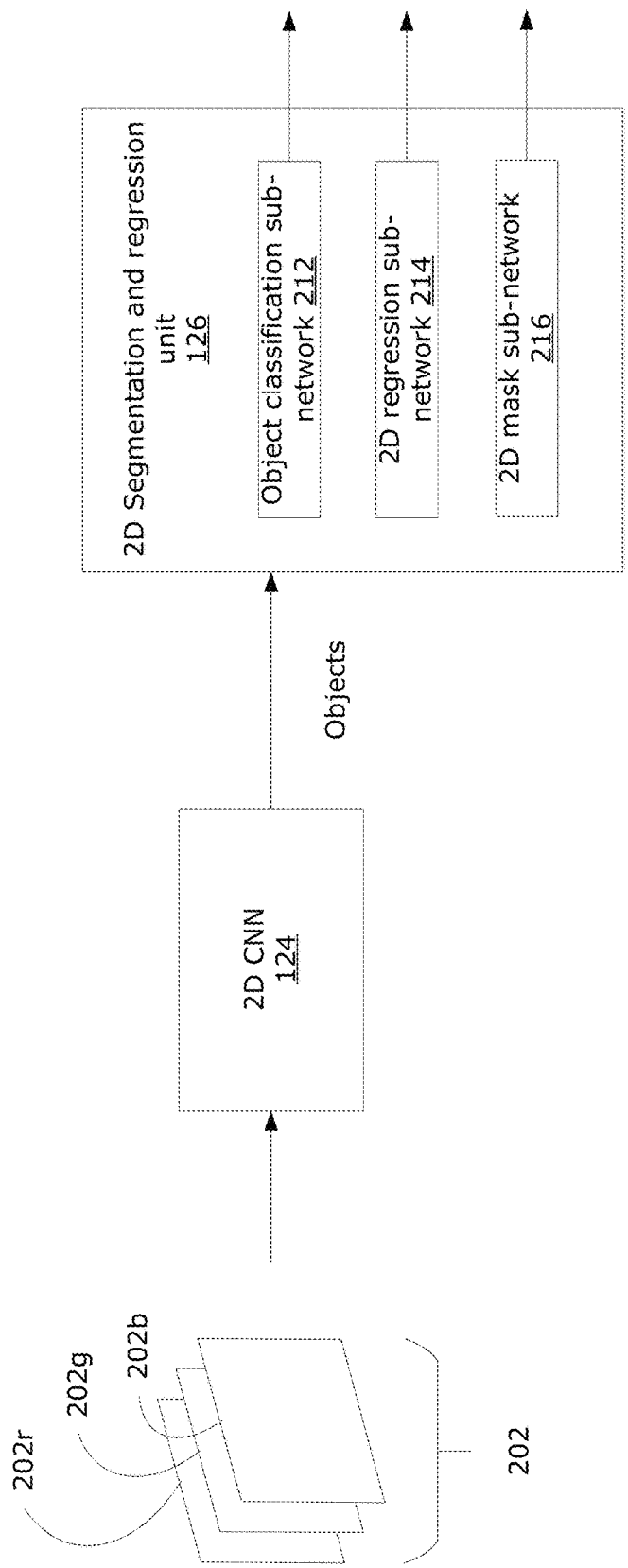
FIG. 2 is a schematic illustrating an example of a set of 2D camera images being used with a 2D CNN.

As discussed above, data output by the camera unit 116 may be in the form of 2D image data, such as 2D RGB image data. Various computer vision systems that implement machine learning algorithms are designed to analyze 2D image data, such as 2D RGB image data, provide information that may be used for controlling the autonomous vehicle 100. FIG. 2 illustrates an example of 2D computer vision system that implements a machine learning algorithm for object detection using 2D image data 202 representative of an image captured by the camera unit 116. In this example, the 2D image data 202 is in the form of three 2D arrays 202r, 202g, 202b representing red, green and blue intensity, respectively, in the 2D image captured by the camera unit 116. The 2D image data 202 is provided as input into the 2D CNN 124. The 2D CNN 124 may be any CNN or other deep neural network that can be trained to learn to detect objects in the 2D image data. The 2D CNN 124 may be trained on any data that is in a form accepted by the 2D CNN 124. For example, regional CNNs (RCNNs) have been used for object detection and segmentation. Example RCNNs for object detection include, for example, Fast RCNN, Faster RCNN, and Mask R-CNN. Mask R-CNN, in particular, has been used to provide object detection and segmentation on a pixel level. Generally, the 2D computer vision system includes a 2D CNN 124 and the 2D segmentation and regression unit. The 2D CNN 124 may compute features corresponding to objects detected in the 2D image data and output detected objects in the form of feature arrays, which may be further processed by the 2D segmentation and regression unit 126. The 2D segmentation and regression unit 126 in this example includes sub-networks including an objection classification sub-network 212 for labeling detected object with classes of interest (e.g., cars, trucks and pedestrians, in the context of autonomous vehicles), a 2D regression sub-network 214 for performing 2D bounding box regression and generating 2D bounding boxes, and a 2D mask sub-network 216 for performing 2D mask segmentation for masks for the detected objects. Other sub-networks may be used. Mask R-CNN may be used to combine functions of the 2D CNN 124 with functions of the 2D segmentation and regression unit 126, as discussed further below. Mask R-CNN has been found to produce relatively accurate object detection, classification and localization in 2D image data, and may be suitable for use in autonomous vehicles. Generally, 2D image data that is inputted into a computer vision system may be used for training the computer vision system, or an already-trained computer vision system may perform object detection on the inputted 2D image data. A trained computer vision system may use inference on the inputted 2D image data, for example, to perform the object detection.

However, a 2D computer vision system designed for analyzing 2D image data may not be designed to analyze 3D data. In examples described herein, 3D data (e.g., 3D data received from LIDAR unit 114 or other sensors such as radar sensor 112, a stereo camera of the camera unit 116 or an ultrasound unit (not shown) may be converted to a set of one or more arrays that is accepted as input and/or usable for training 2D computer vision systems.

Figure 3:
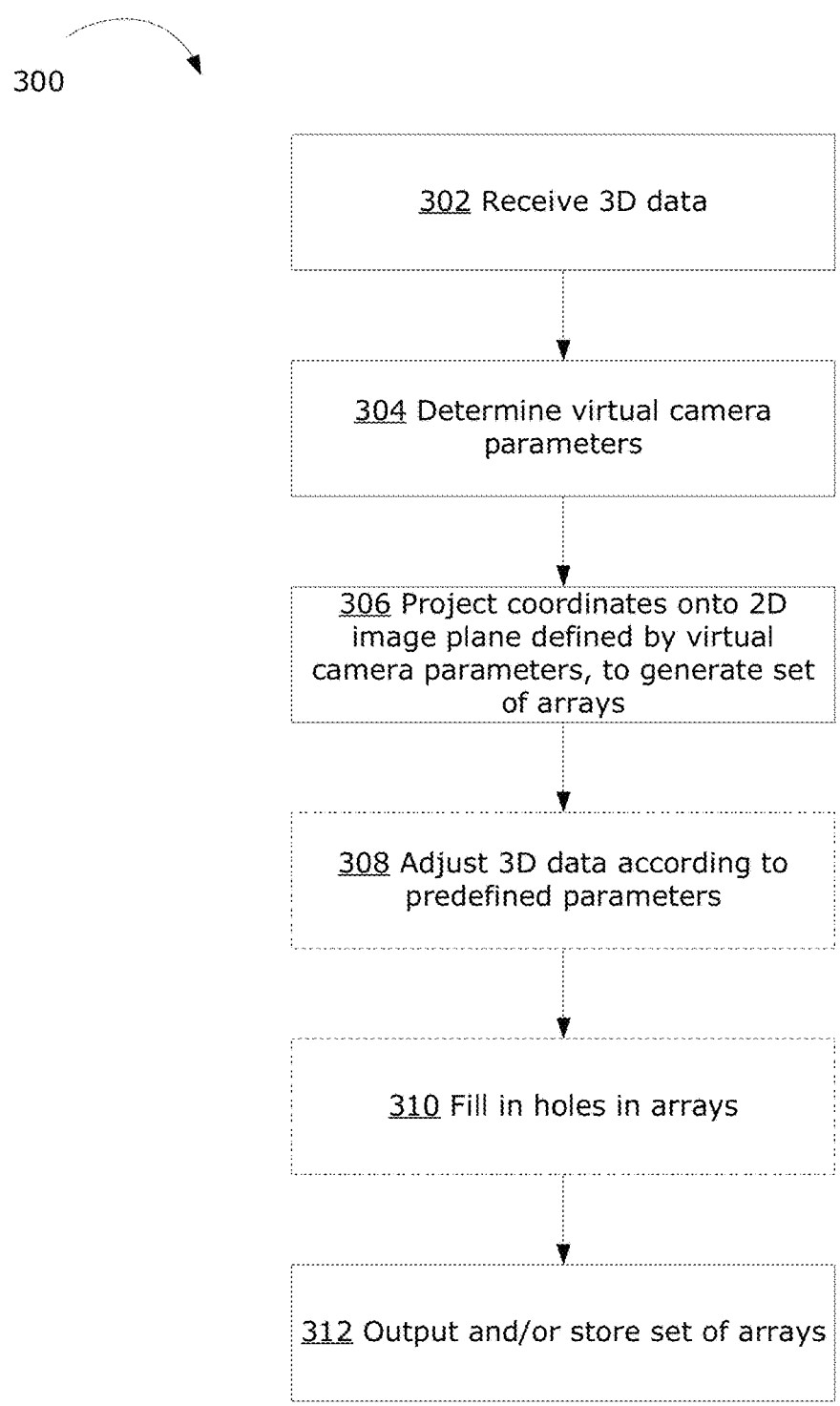
FIG. 3 is a flowchart illustrating an example method for encoding 3D point cloud data into a set of 2D arrays.
Figure 4:
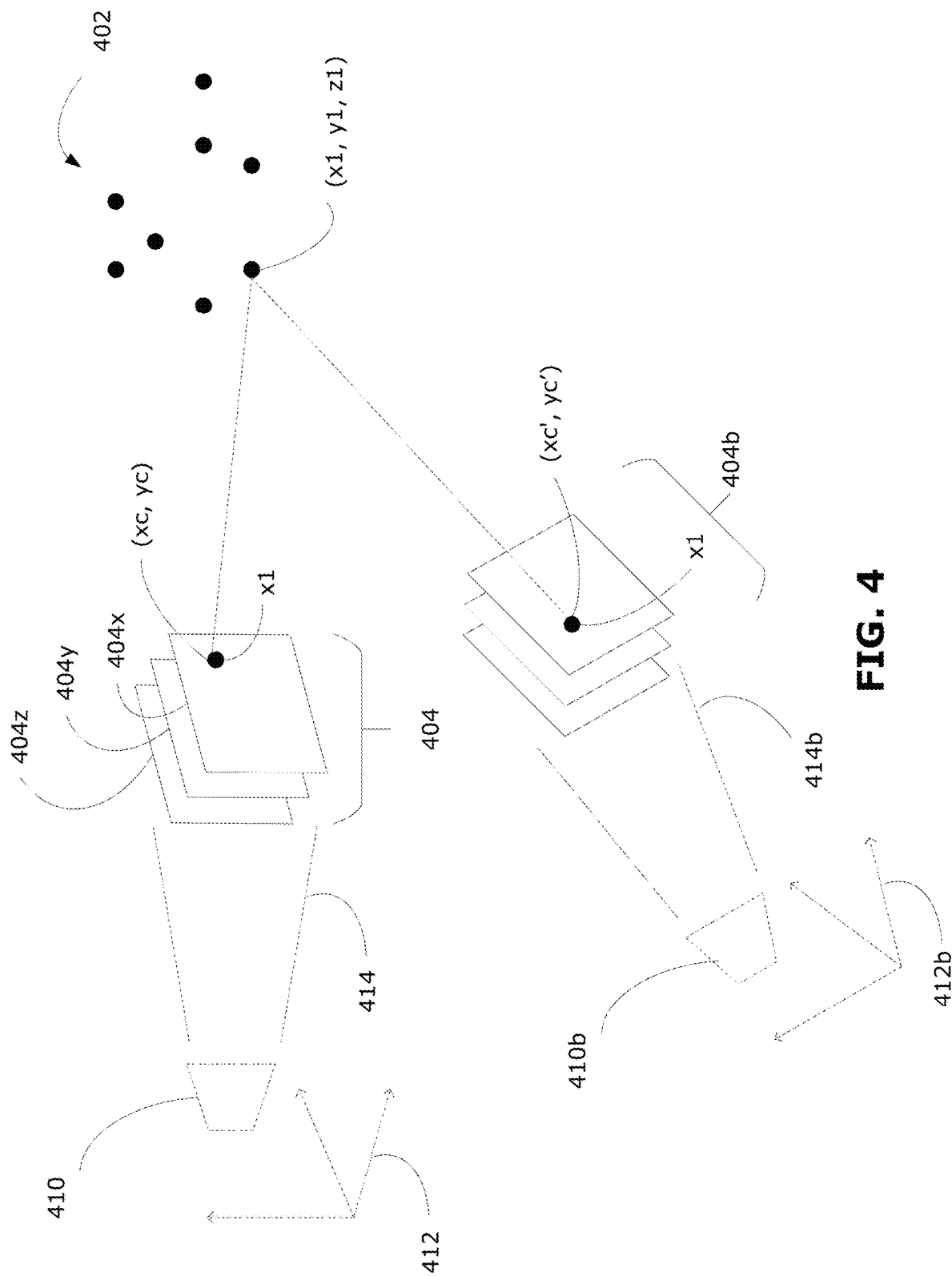
FIG. 4 conceptually illustrates the example method of FIG. 3.

FIG. 3 is a flowchart of an example method 300 for encoding 3D data into a set of one or more arrays, for example a set of three 2D arrays (e.g., encoding the X,Y,Z 3D coordinates), suitable for input to a 2D computer vision system. FIG. 4 conceptually illustrates the example method 300. In the context of the autonomous vehicle 100 of FIG. 1, the method 300 may be performed by the 3D data encoder 122 of the data analysis unit, for example using an image processing unit or general processing unit of the vehicle 100. The method 300 may be performed in real-time or near real-time, as the 3D data is received from a sensor, such as the LIDAR unit 114, for example.

At 302, the set of 3D data is received. In some examples discussed herein, the 3D data is received from the LIDAR unit 114, however the method 300 may also be applied to other 3D data received from other sensors, such as a radar unit, a stereo camera, or an ultrasound unit. In the autonomous vehicle 100, the 3D data may be data received from a sensor, such as LIDAR unit 114 of the sensor system 110, and provided to the data analysis system 120 in real-time or near real-time. In other examples, the 3D data may be previously stored data (e.g., previously stored data received from other sensors, such as radar units, stereo cameras, or ultrasound units) and retrieved from a database or other memory.

At 304, virtual camera parameters are determined. The virtual camera parameters define a 2D image plane for performing the encoding to 2D. The virtual camera parameters include a camera projection matrix (typically a 3×4 camera projection matrix), which defines how a 3D point is projected or mapped to a 2D location in the 2D image plane. The virtual camera parameters may also define a 3D region of interest (ROI) corresponding to the FOV of the 2D image plane. The ROI may be defined as a range of x, y and z coordinates (e.g., represented by selectable values Xmin, Xmax, Ymin, Ymax, Zmin and Zmax), and defines the subset of 3D data that is to be converted to the set of arrays.

A set of virtual camera parameters may be conceptually represented by a virtual camera 410 having a certain orientation and location (represented by a virtual reference coordinate system 412) and a certain focus depth, as shown in FIG. 4. The camera projection matrix defines the 2D image plane of the virtual camera 410. In some examples, a certain angle of view 414 of the virtual camera 410 may be defined by the ROI defined in the virtual camera parameters. Using the virtual camera parameters, a data point in the 3D data 402 can be projected onto the 2D image plane and encoded in a set of arrays 404, as will be discussed further below.

It should be noted that the virtual camera parameters may be varied, in order to map the 3D data 402 to different 2D image planes. For example, FIG. 4 shows a different set of virtual camera parameters represented by a virtual camera 410b. By changing the camera projection matrix, the virtual camera 410b has a different virtual reference coordinate system 412b and a different virtual angle of view 414b. The projection of the 3D data 402 thus results in a different set of arrays 404b. By changing the virtual camera parameters, the 3D data 402 may thus be projected onto a 2D image plane having any selected orientation, location and/or size.

The virtual camera parameters may be predefined (e.g., by the data analysis system 120 in the autonomous vehicle 100). The virtual camera parameters may also be defined based on user input. The virtual camera parameters may be defined to replicate the 2D image captured by an actual camera unit 116 in a vehicle 100, for example. This may be the case where the set of one or more arrays is intended to be used together with the captured 2D image data. The virtual camera parameters may also be selected to generate a set of arrays for which there is no corresponding actual camera. That is, the virtual camera parameters may be selected to project the 3D data to a 2D image plane that does not coincide with a FOV of an actual camera. In this way, the 3D data may be used to artificially generate 2D data where an actual camera is not present (e.g., due to physical restrictions, cost considerations, or other reasons).

It should be noted that the method 300 may be performed on one set of 3D data using more than one set of virtual camera parameters. Thus, more than one set of arrays, corresponding to more than one virtual 2D image plane, may be generated using a single set of 3D data. This may be useful where the 3D data covers a wider FOV than 2D image data captured by an actual optical camera (e.g., 3D data received from a LIDAR unit 114 may capture a 360° FOV). In this way, the 3D data may be used to mimic a 360° optical camera.

Returning to FIG. 3, at 306, the 3D coordinates of each data point in the 3D data are projected onto the 2D image plane defined by the virtual camera parameters, to generate a set of one or more converted arrays. The projection is performed by applying the 3×4 camera projection matrix P, which is defined as:

$$P=[KR|t]$$

where K is the camera intrinsic parameter matrix, R is the rotation matrix, and t is the camera translation vector, and K, R and t together represent the defined virtual camera parameters. An example of these matrices and vector, and how to initialize them, is described by Geiger et al. in *Conference on Computer Vision and Pattern Recognition* (*CVPR*), 2012.

Using the camera projection matrix P, each data point in the 3D data is projected onto the 2D image plane. For a given data point in the 3D data points defined as $X_w=[X,Y,Z,1]^T$, the projection results in a 2D location:

$$x=[x_h[0]/x_h[3], x_h[1]/x_h[3]]^T=[xc,yc]^T$$

where $x_h=PX_w$. Optionally, rounding may be applied to x (e.g., to ensure that xc and yc are integer values).

The x, y and z values of the given data point in the 3D data are each stored in a respective 2D array, at the array element having index (xc, yc) (also referred to as element (xc, yc) for brevity). The projection result is stored in three different 2D arrays (one 2D array storing x values, one 2D array storing y values, and one 2D array storing z values). This is conceptually illustrated in FIG. 4. The data point having 3D coordinates (x1, y1, z1) in the 3D data 402 is mapped to an index (xc, yc) in the set of arrays 404. The set of arrays 404 in this example includes three arrays—a first array 404x storing x values, a second array 404y storing y values and a third array 404z storing z values. In the example shown, the value x1 is stored at element (xc, yc) of the first array 404x. Similarly, the value y1 is stored at element (xc, yc) of the second array 404y; and the value z1 is stored at element (xc, yc) of the third array 404z. The three 2D arrays 404x, 404y, 404z each have the same height and width dimensions (e.g., h×w). In some examples, the three 2D arrays 404x, 404y, 404z may be encoded in a 3D array (i.e., a set of one array instead of a set of three arrays) having the same height and width dimensions, and a depth of 3 (e.g., h×w×3), where each depth layer corresponds to one of x, y or z values.

It will be appreciated that the given data point may be mapped to a different index if a different set of virtual camera parameters is used. For example, for a different set of virtual camera parameters representing the virtual camera 410b, the given data point (x1, y1, z1) in the 3D data 402 is mapped to an different index (xc', yc') in the set of arrays 404b, and the value x1 is shown as being stored at the element (xc', yc').

In some examples, the relationship between each data point encoded into the 2D array and the corresponding data point in the 3D data may be stored as a mapping index. The mapping index indicates the original 3D position of each entry in the 2D arrays. The mapping index provides information that may be used for performing 3D segmentation using the 2D masks, as discussed further below.

The projection of data points of the 3D data 402 to the set of arrays is performed for each data point in the 3D data 402, or for each data point in the subset of 3D data where an ROI has been defined.

After projection has been completed, optionally, at 308, the data points of the 3D data that have been encoded into the 2D arrays may be adjusted (e.g., shifted, scaled, normalized and/or quantized) according to one or more predefined parameters. The predefined parameters for adjusting the data points of the 3D data may include the virtual camera parameters, as well as other parameters. Adjusting the data points of the 3D data in this way may help to ensure the values contained in the encoded arrays match the format for a 2D image, which might be required for input to a 2D computer vision system. For example, typical 2D image data may contain integer values in the range of [0, 255], whereas typical data points in the 3D data 402 received from a sensor, such as the LIDAR unit 114, may contain values in the range of [−400, 400]. Adjusting the encoded data points of the 3D data may thus involve shifting and scaling the data points of the 3D data to match the range of values for typical 2D image data. If the virtual camera parameters define a ROI with maximum and minimum values for each of the x, y and z coordinates, then adjusting the encoded 3D data may include restricting the encoded 3D data to be a subset within the defined ranges of the ROI, and normalizing the subset of data according to the defined ranges. Adjusting the encoded 3D data may also include quantization, for example in cases where scaling the data points of the 3D data results in non-integer values. The following equations provide an example of how x, y and z coordinates (x1, y1, z1) of a given data point of the 3D data may be shifted, scaled, normalized and quantized:

$$\widetilde{x1} = \text{round}\left\{\left(\frac{x1-X\min}{X\max-X\min}\right)\times 255\right\}$$

$$\widetilde{y1} = \text{round}\left\{\left(\frac{y1-Y\min}{Y\max-Y\min}\right)\times 255\right\}$$

$$\widetilde{z1} = \text{round}\left\{\left(\frac{z1-Z\min}{Z\max-Z\min}\right)\times 255\right\}$$

where $\widetilde{x1}$, $\widetilde{y1}$, $\widetilde{z1}$ are the adjusted values after being scaled to the range [0, 255]; normalized to the ranges [Xmin, Xmax], [Ymin, Ymax] and [Zmin, Zmax] for x, y and z values, respectively; and quantized by rounding to the nearest integer.

An alternative equation for adjusting the z value is:

$$\widetilde{z1} = \text{round}\left\{\left(\frac{\|[x1,y1,z1]\|}{Z\max-Z\min}\right)\times 255\right\}$$

The adjusted encoded 3D data is stored in the set of 2D arrays. Other equations and other methods of adjusting the encoded 3D data may be used. For example, it may not be necessary to quantize (or round) the x, y and z values of the encoded data points of the encoded 3D data in cases where the computer vision system accepts non-integer input (e.g., accepts floating point input). Further, it may not be necessary to shift and scale the x, y and z values of the encoded data points of the encoded 3D data to match the range of typical 2D RGB image data in cases where the computer vision system accepts other forms of input data.

In some examples, 308 may be omitted entirely. For example, the computer vision system may accept the range of values encoded in the 3D data; or the encoded 3D data may already be in a range acceptable to the computer vision system.

In some examples, where adjusting is performed, the projecting and adjusting may be performed together as a single step or using a single calculation. That is, 306 and 308 may be performed together. In some examples, adjusting may be performed before or after the projecting. In some examples, the 3D data may be adjusted before performing the projection, and additional adjusting may be performed following the projection. For example, prior to projection the 3D data may be adjusted by selecting a subset of the data points of the 3D data and normalizing x, y, z values of the data points of the subset of the 3D data according to a defined ROI, and following projection the elements in the arrays may be quantized. Other variations may be possible.

Optionally, at 310, any holes in the set of arrays may be filled. A 2D array encoded from projected 3D data may have elements where no corresponding 3D data has been projected. The value contained at such elements may be set to zero or NULL, and such empty elements may be referred to in this disclosure as holes in the array. Filling in any holes in the 2D arrays results in a fuller set of 2D data for input to the 2D computer vision system, which may help to obtain more accurate object identification output.

Any suitable approach may be used to fill in the holes. For example, a mathematical morphology operation such as dilation or closing may be used. One approach may be to use a hole-filling algorithm that preserves the 3D-to-2D mapping, based on a 5×5 2D dilation kernel and nearest neighborhood upscaling by a factor of 2. Other approaches may include performing interpolation. In some examples, filling in holes in the arrays may not require all holes to be filled. For example, holes may be filled only in areas of interest (e.g., only for a certain area around elements having lower z values—meaning an object is at a close distance).

At 312, the set of arrays are outputted and/or stored. For example, the set of arrays may be outputted and/or stored in a format that is used to store 2D camera images, such as an RGB or PNG file. If a mapping index was stored, the mapping index may also be stored and associated with the set of arrays. Further, the set of arrays may be associated with the original set of 3D data. In some examples, where the virtual camera parameters were defined to replicate an actual camera, the set of arrays may also be associated with the 2D image data captured by the actual camera.

The set of arrays generated by the method 300 may be used as input to a computer vision system, such as a deep convolutional neural network, that is configured for analyzing 2D image data, for example using Mask R-CNN. The set of arrays may be used for training the 2D computer vision system to learn to perform objection detection, or may be inputted to the already-trained 2D computer vision system for performing objection detection. For example, the set of arrays may be inputted to the already-trained 2D computer vision system for interference. In the vehicle 100 of FIG. 1, the set of arrays generated using the example method 300 may be outputted by the 3D data encoder 122 and provided as input to the 2D CNN 124 and subsequently to the 2D segmentation and regression unit 126. The 2D CNN 124 and 2D segmentation and regression unit 126 may then be trained using the set of arrays, so that the 2D CNN 124 and 2D segmentation and regression unit 126 learn to identify objects of interest, such as pedestrians or other cars, from 3D data. Thus, the 2D CNN 124 and 2D segmentation and regression unit 126 may be adapted to use 3D data as well as 2D image data. In some examples, the outputs of the 2D CNN 124 may be used by a 3D segmentation and regression unit 128, as discussed further below.

Figure 5A:
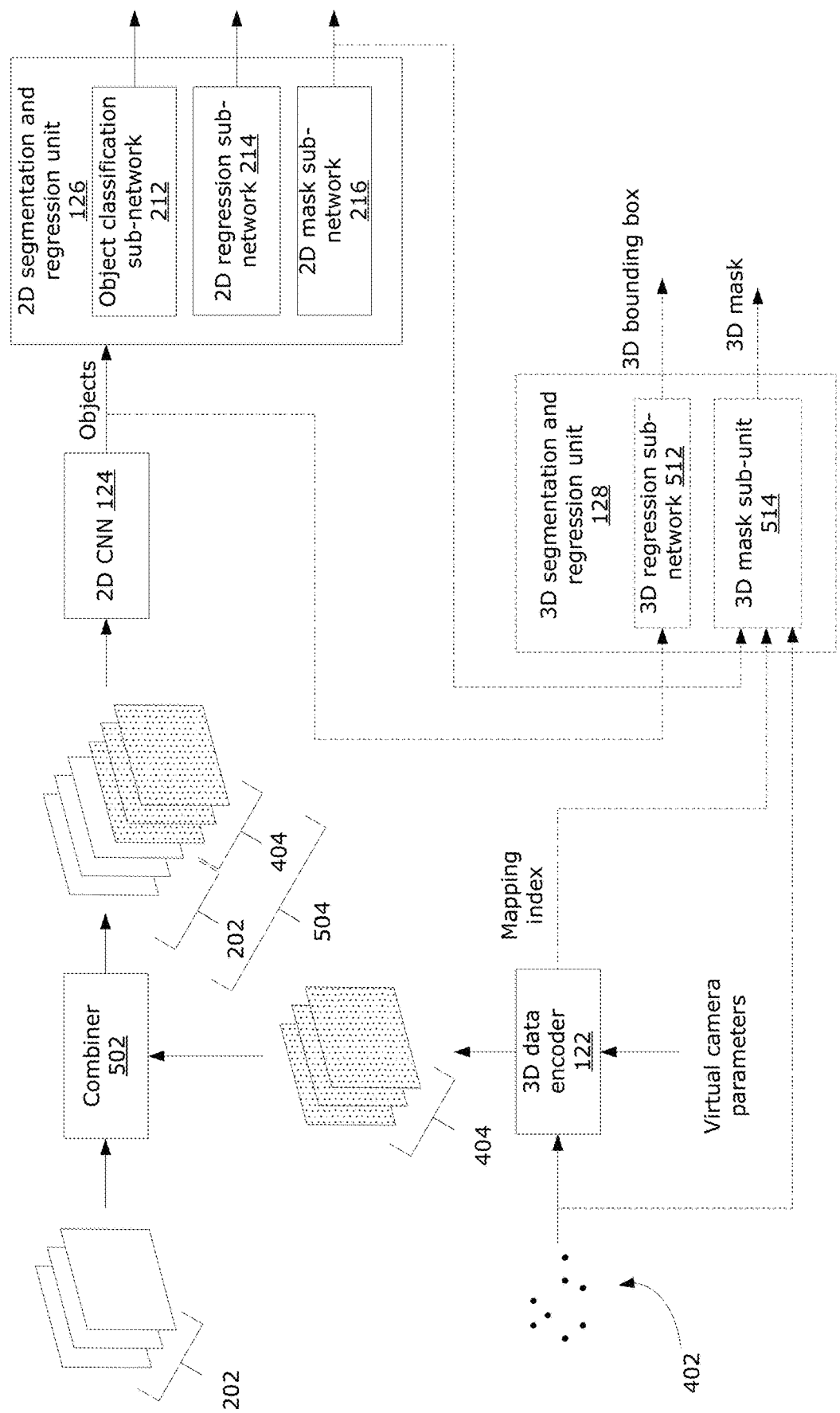
FIG. 5A is a schematic illustrating an example of 2D camera data together with 3D data being used with a 2D CNN.

FIG. 5A schematically illustrates an example method for performing object detection by a computer vision system, using both 2D image data (received from camera unit 116) and 3D data (received from, for example, LIDAR unit 114).

The 3D data 402 is encoded into a set of 2D arrays 404 using a set of virtual camera parameters, for example by the 3D data encoder 122 using the method 300 described above.

Combiner 502 performs data fusion on the set of arrays 404 and the 2D image data 202, resulting in a set of combined data 504. In some examples, the combination may be performed by concatenating the set of arrays 404 with the 2D image data 202 (also referred to as data fusion) and the combined data 504 may in that case be referred to as a set of concatenated data. Performing data fusion may include performing spatial registration between the set of arrays 404 and the 2D image data 202. In the case where the set of arrays 404 is generated using virtual camera parameters that correspond to the actual camera parameters used to capture the 2D image data 202, spatial registration may not be required. However, even in the case where spatial registration is not required, performing spatial registration is expected help to improve combination of the 2D image data 202 and the set of arrays 404, and may help to improve performance of the computer vision system.

The 2D CNN 124 is then applied to the set of combined data 504. Similar to FIG. 2, the output of the 2D CNN 124 may be used by the 2D segmentation and regression unit 126 to perform object classification (using the object classification sub-network 212), 2D bounding box generation (using the 2D regression sub-network 214) and 2D mask segmentation (using the 2D mask sub-network 216). The 2D CNN 124 together with the 2D segmentation and regression unit 126 form a mask regional convolution neural network (Mask R-CNN) that include sub-networks which implement machine learning algorithms for object detection, classification, regression, and segmentation. Some modification may be made to the Mask R-CNN, in order to account for the addition of the set of converted arrays in the combined data 504. For example, modification may be made so that Mask R-CNN accepts 2D RGB image data (e.g., having a depth of 3 arrays), a set of 2D arrays encoded from 3D data (e.g., having a depth of 3 arrays), or the combined data (e.g., having a depth of 6 arrays).

The 2D CNN 124 and the 2D segmentation and regression unit 126 may require training to recognize 3D coordinates encoded in the 2D arrays, in order to successfully perform object detection, classification, regression, and segmentation on the set of 2D arrays encoded from 3D data. The 2D CNN 124 and the 2D segmentation and regression unit 126 may be trained using the set of 2D arrays, for example in a training phase prior to use in the real world. The 2D CNN 124 and the 2D segmentation and regression unit 126 may be trained outside the context of an autonomous vehicle, for example training may take place in a workstation, and the trained 2D CNN 124 and the 2D segmentation and regression unit 126 may be then implemented in the autonomous vehicle for operation in the real world.

Optionally, the 3D segmentation and regression unit 128 may be applied to the outputs of the 2D CNN 124. For example, the 3D segmentation and regression unit 128 may include a 3D regression sub-network 512 to estimate the parameters (e.g. width, height, length, x, y, z coordinates, etc.) of the 3D bounding boxes of the objects. The 3D regression sub-network 512 may be trained to regress the parameters of a 3D bounding box corresponding to subset of the data points in the set of 2D arrays 404 to output a set of 3D object bounding boxes. 3D point semantic segmentation can be performed by a 3D mask sub-unit 514, using the stored mapping indexes to associate the 2D masks with a corresponding cluster of 3D data points, thus generating a 3D mask. Any suitable method may be used for performing the 3D regression. The 3D mask sub-unit 514 is not implemented using a neural network. Although the present disclosure refers to a 3D segmentation and regression unit 128, in some examples 3D segmentation may be performed alone without regression, or 3D regression may be performed alone without segmentation.

Thus, a 2D computer vision system may be trained on and perform objection detection, classification, regression, and segmentation on both 2D image data and 3D data together, to provide 2D outputs (e.g., object classes, 2D bounding boxes and 2D masks) and optionally 3D outputs (e.g., 3D bounding boxes and 3D masks).

Figure 5B:
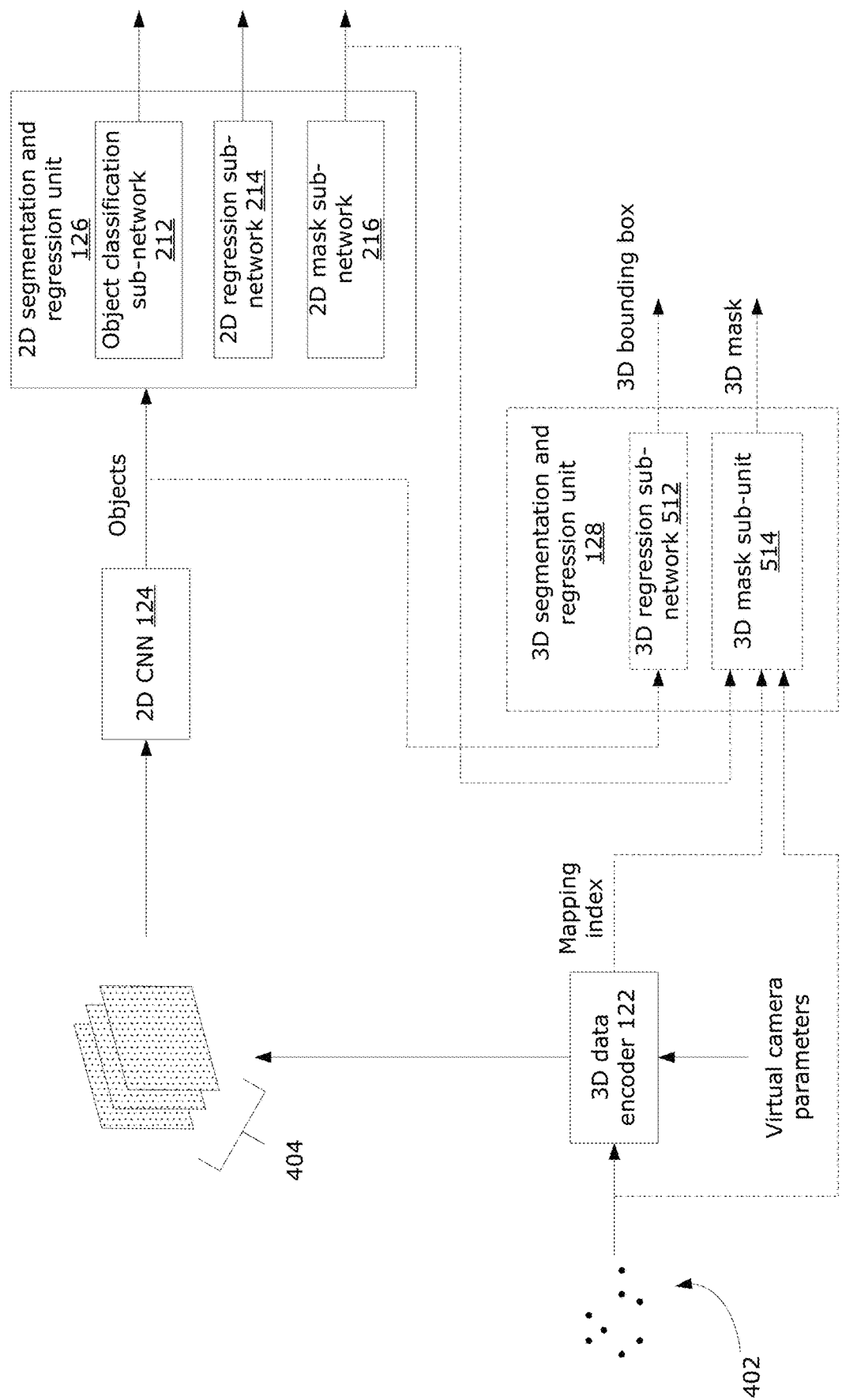
FIG. 5B is a schematic illustrating an example of 2D CNN being used with 3D data that has been encoded into 2D arrays.

FIG. 5B schematically illustrates another example method for performing object detection by a computer vision system, in this case using 3D data (received from, for example, LIDAR unit 114). This example is similar to the example of FIG. 5A, however the 2D computer vision system accepts as input only the set of encoded arrays, and without any 2D image data.

Using the example method illustrated in FIG. 5B, object detection may be carried out using a 2D computer vision system, without the need to receive 2D image data from a camera, such as an optical camera. For example, the 3D data may be encoded into a set of arrays using a set of virtual camera parameters that simulates a FOV that is not captured by an actual optical camera. The 2D computer vision system may be trained to perform object detection on the encoded 3D data. The 2D computer vision system that is trained in this way learns a new set of weights from the encoded 3D data. In this way, the 2D computer vision system is trained to work with 3D data (such as a point cloud received from the LIDAR unit 114). This extension of the 2D computer vision system, which is conventionally trained to process 2D RGB image data, into 3D data may be referred to as a form of transfer learning or domain adaptation.

Similarly to the example of FIG. 5A, the 3D data 402 is encoded into a set of arrays 404 using a set of virtual camera parameters, for example by the 3D data encoder 122, in accordance with the method 300 described above. The 2D CNN 124 is then applied to the set of arrays 404. For example, the 2D CNN 124 may be included in a Mask R-CNN. The 2D CNN 124 together with the 2D segmentation and regression unit 126 (including the object classification sub-network 212, the 2D bounding box sub-network 214 and 2D mask sub-network 216) may generate outputs including object class, 2D bounding box and 2D mask.

Optionally, the 3D segmentation and regression unit 128 (which may include the 3D bounding box sub-network 512 and the 3D mask sub-unit 514) may be applied to the output of the 2D CNN 124, similarly to the example of FIG. 5A, to generate outputs including 3D bounding box and 3D mask.

The set of encoded arrays, combined or not combined with 2D image data, may be used for training a computer vision system. For example, the set of encoded arrays may be used to train Mask R-CNN to detect multiple object classes of interest. In some examples, Mask R-CNN may be trained using combined data, in order to perform object detection, classification, regression, and segmentation when the input is 2D image data combined with the set of encoded arrays.

In some examples, the 2D computer vision system (e.g., including Mask R-CNN) may be initially trained by using 2D image data as input to output 2D masks as weak labels, together with bounding boxes, masks and object classes. This may serve as a starting point for training the computer vision system, using the set of encoded arrays as further training input, to train the computer vision system to work with arrays encoded from 3D data.

Figure 6:
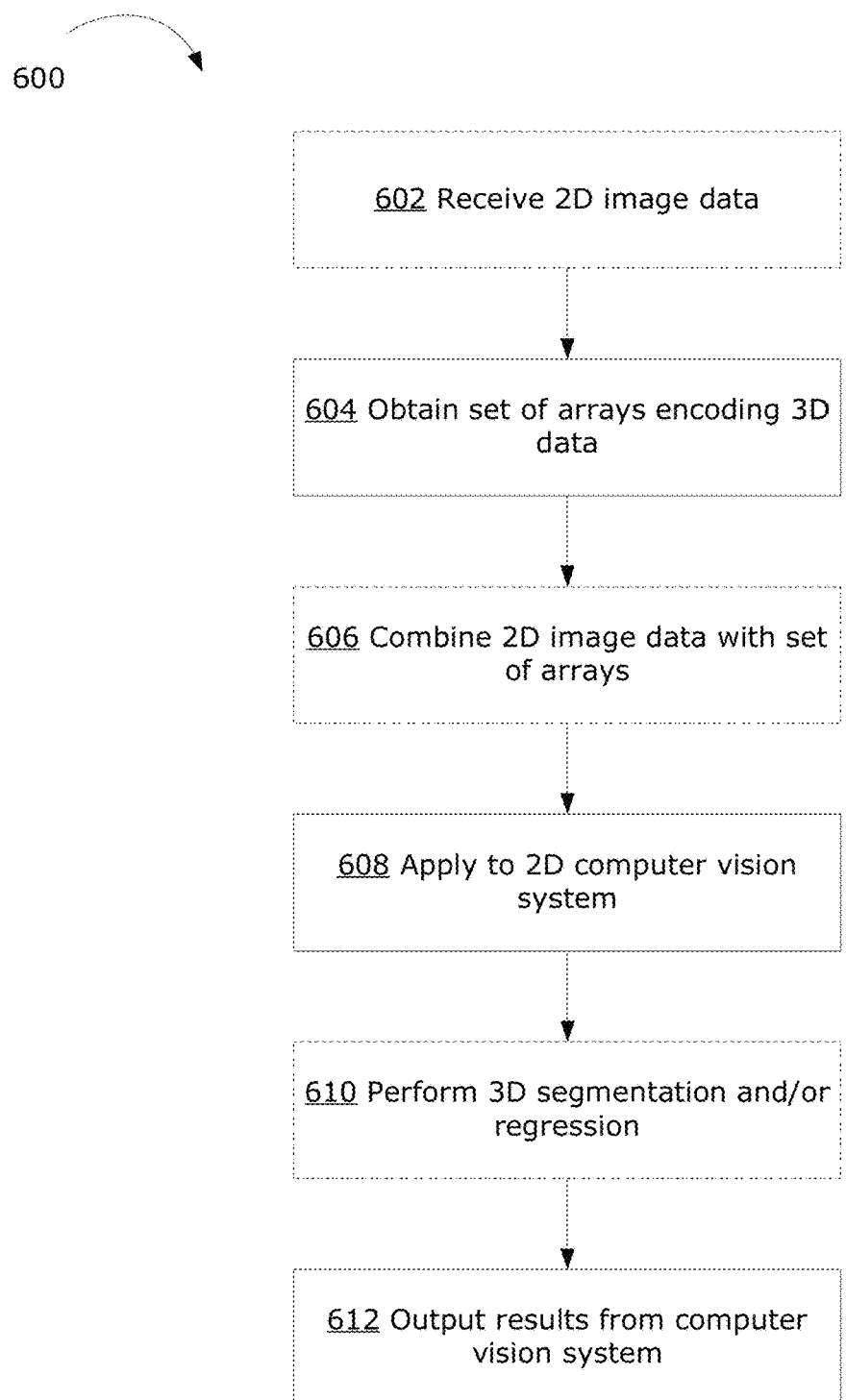
FIG. 6 is a flowchart illustrating an example method for performing object detection using 3D data with 2D CNN.

FIG. 6 is a flowchart illustrating an example method 600 for applying a 2D computer vision system to a set of arrays encoded from 3D data. The 2D computer vision system in the method may be already trained to work on 3D data, as discussed above, and the 2D computer vision system may accept the set of arrays as input for performing object detection by inference. Examples of the method 600 may be used for implementing the examples of FIGS. 5A and 5B. In the autonomous vehicle 100 of FIG. 1, the method 600 may be performed by components of the data analysis system 20, including the 2D CNN 124, the 2D segmentation and regression unit 126 and optionally the 3D segmentation and regression unit 128, for example using an image processing unit or a general processing unit of the vehicle 100. In some examples, the method 600 may be performed following the method 300.

At 602, optionally, 2D image data may be received, for example from camera unit 116. The 2D image data may be in the form of a set of RGB arrays.

At 604, a set of arrays encoded from 3D data are obtained from the 3D data encoder 122. The set of arrays may be a set of three 2D arrays containing 3D data projected to a 2D image plane, as discussed above.

If 2D image data was received at 602, then at 606 the 2D image data and the set of arrays encoded from 3D are combined into a set of combined data, using for example the combiner 502. For example, the RGB arrays containing the 2D image data may be concatenated with the set of arrays encoded from 3D data. Spatial registration may be performed to combine the data.

At 608, the 2D computer vision system is applied to the data. If there is combined data, the 2D computer vision system may be applied to the combined data. Otherwise, the 2D computer vision system is applied to the set of encoded arrays. Any suitable 2D computer vision system may be used, for example the 2D CNN 214, and the sub-networks 212, 214, 216 described above. The outputs of the 2D computer vision system may include object class (e.g., cars, trucks and pedestrians, in the context of autonomous vehicles), 2D bounding boxes and 2D masks for each detected object, for example. When the computer vision system is applied to combined data, the relative contribution of 2D image data vs. 3D data may be adjusted by relative weighting or scaling between the 2D image data and the set of encoded arrays.

Optionally, at 610, the 3D segmentation and regression unit 128 may perform 3D segmentation and/or regression on the stored mapping index. The stored mapping index, from calculating the projection of 3D data to 2D image plane, may be used, by 3D mask sub-unit 514, to determine clusters of 3D data points corresponding to respective 2D masks. The clusters of 3D data points corresponding to a 2D mask is referred to as a 3D mask. 3D regression may be performed using a 3D regression sub-network 512, to generate and output 3D bounding boxes.

At 612, the results from the computer vision system, including the outputs of 3D segmentation and/or regression if performed, are outputted. In the example of an autonomous vehicle 100, the outputs may be provided by the data analysis system 120 to the path planning system 130 and the vehicle control system 140.

The method 300 and 600 may be performed in real-time or near real-time, as 3D data and 2D image data are captured, in order to detect and identify objects in the surrounding environment in real-time or near real-time, particularly when used in an autonomous vehicle.

Figure 7:
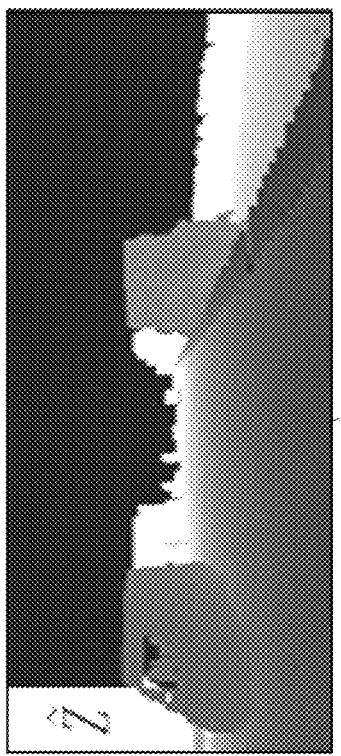
FIG. 7 shows an example 2D camera image and corresponding example 2D arrays encoding 3D data.
Figure 7:
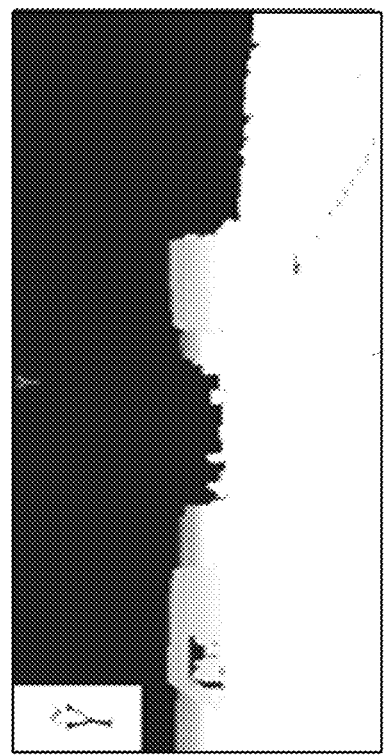
Figure 7:
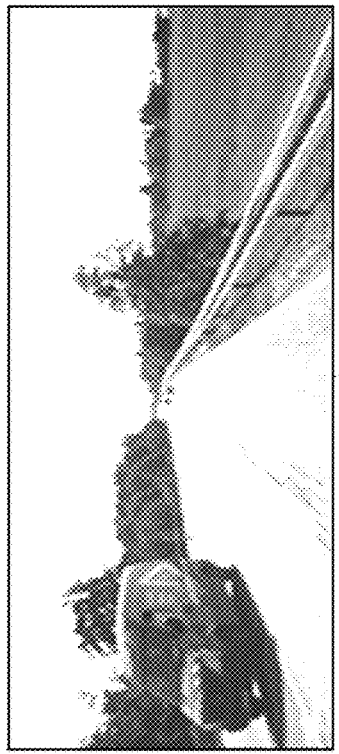
Figure 7:
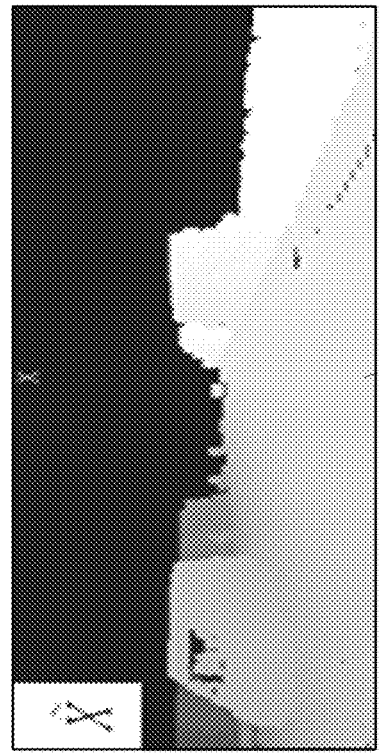

FIG. 7 illustrates an example of how 3D data may be encoded into a set of 2D arrays corresponding to an actual captured 2D image. FIG. 7 shows an example 2D image 702 captured by an optical camera. Although shown as a single image 702, it should be understood that the 2D image 702 is represented by 2D image data and the 2D image data may be stored as a set of RBG arrays. Using a set of virtual camera parameters corresponding to the FOV of the optical camera, 3D LIDAR point cloud data is encoded into a set of three 2D arrays that corresponds to the 2D image 702. The first array 704x stores x values of the 3D data; the second array 704y stores y values of the 3D data; and the third array 704z stores z values of the 3D data. In this example, the x, y and z values have been adjusted to match the format of typical RGB image data.

The present disclosure provides examples in which the encoded 2D arrays may be used together with 2D image data that is in the form of RGB arrays (e.g., arrays containing image data using three channels, corresponding to red, green and blue). In other examples, the encoded 2D arrays may be used together with 2D image data in other forms, for example 2D image data in the form of grayscale arrays (e.g., arrays containing image data in one channel, corresponding to light/dark) or 2D image data in the form of arrays including transparency information (e.g., arrays containing image data with an additional alpha channel for transparency/opacity).

The present disclosure may enable 3D data, such as LIDAR point cloud data, to be converted and encoded as 2D arrays, which may be stored in 2D image data formats (e.g., PNG or JPG files). The encoded arrays may be used with 2D computer vision systems designed to accept 2D arrays as input. 2D computer vision systems, such as those based on Mask R-CNN and other CNNs, may thus be used on 3D data. This may enable multiple object classes (e.g., including cars, trucks and pedestrians) to be detected and identified using 3D data, without separately training the computer vision system for each different object classes. By adding a 3D regression and segmentation unit to a 2D computer vision system, 3D object detection may be performed, without separately training the computer vision system for each different object classes). The mapping index generated during projection of 3D data to 2D arrays may be used to map the 2D masks to 3D space.

In some examples, the use of 3D regression on the output of 2D CNNs (inside of a single end-to-end network) may be of benefit even where only 2D image data is used as input. Any suitable method may be used to perform 3D regression in order to obtain 3D bounding boxes.

Other computer vision systems, such as Aggregate View Object Detection with Feature Pyramid Network (AVOD-FPN), may accept both 2D image data and 3D data as input. The present disclosure may enable the AVOD-FPN system to be simplified. The 3D data may be encoded into a set of one or more 2D arrays, which may be combined with the 2D image data (e.g., concatenated together). The set of combined data may be provided as input to AVOD-FPN, which may simplify the AVOD-FPN algorithm implemented by the by removing the feature computation stage for bird's eye view.

Examples of the present disclosure may be used to project 3D data onto any selected 2D image plane (e.g., different angles of view, different rotation angles and/or different elevation angles).

Examples of the present disclosure have been described in the context of implementation in an autonomous vehicle. It should be understood that the disclosed methods and systems may be implemented outside of autonomous vehicles. For example, the disclosed methods may be implemented as software in any suitable processing unit, such as a computing device, a workstation or non-vehicular device.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method comprising:
receiving a set of 3D data in the form of a point cloud;
encoding the set of 3D data into a set of arrays, the encoding including projecting data points in the set of 3D data onto a common 2D image plane by, for each data point of the 3D data:
projecting 3D coordinates of the data point onto the 2D image plane to determine a projected 2D index, the 2D image plane being defined by a set of defined virtual camera parameters, the set of virtual camera parameters including a camera projection matrix defining the 2D image plane; and storing each 3D coordinate of the data point in a respective array of the set of arrays at the projected 2D index; and outputting the set of arrays for input to a 2D convolutional neural network (CNN) configured to perform object detection on the set of arrays during training or inference of the 2D CNN.

2. The method of claim 1, further comprising:
adjusting the 3D data according to one or more predefined parameters to generate a set of adjusted 3D data;
wherein the adjusting is at least one of: scaling, shifting, normalizing or quantizing the 3D coordinates; and
wherein the set of arrays is generated from the adjusted 3D data.

3. The method of claim 1, wherein the set of arrays contains values adjusted to be recognizable as image data.

4. The method of claim 1, wherein the virtual camera parameters include a definition of a region of interest (ROI), the method further comprising:
defining a subset of the 3D data corresponding to the ROI; and
encoding the set of arrays from the subset of the 3D data.

5. The method of claim 1, further comprising filling in any holes in the set of arrays using dilation.

6. The method of claim 1, further comprising:
encoding the set of 3D data to a second set of arrays, the encoding including projecting data points in the set of 3D data onto a common second 2D image plane, using a second set of virtual camera parameters defining the second 2D image plane.

7. The method of claim 1, wherein the set of virtual camera parameters correspond to parameters of an optical camera.

8. The method of claim 7, further comprising:
combining the set of arrays with a set of 2D image data obtained by the optical camera, to generate a set of combined data;
inputting the set of combined 2D data to the 2D CNN configured to perform object detection, the 2D CNN detecting objects in the set of combined 2D and outputting a feature array associated with each detected object; and
performing 2D bounding box generation on the feature array associated with each detected object to generate a 2D object bounding for each detected object and performing 2D object segmentation on the feature array associated with each detected object to generate a 2D object mask for each detected object.

9. The method of claim 8, wherein combining comprises:
performing spatial registration between the set of arrays and the set of 2D image data; and
concatenating the set of arrays with the set of 2D image data.

10. A method comprising:
receiving a set of 3D data in the form of a point cloud;
encoding the set of 3D data into a set of one or more arrays by, for each data point of the 3D data:
calculating a 2D index of the one or more arrays by projecting 3D coordinates of the data point onto a 2D image plane defined by a set of defined virtual camera parameters, the set of virtual camera parameters including a camera projection matrix defining the 2D image plane; and storing each 3D coordinate of the data point in the one or more arrays at the calculated 2D index;
performing object detection using the set of one or more arrays as input to a 2D convolutional neural network (CNN) configured to output a set of detected objects;
performing object classification, regression, and segmentation using the set of detected objects as input to a 2D segmentation and regression unit configured to label the set of detected objects with classes of interest, output a set of 2D object bounding boxes and output a set of 2D object masks for the set of detected objects.

11. The method of claim 10, wherein a mapping index is stored to associate each calculated 2D index to the respective point in the 3D data, the method further comprising:
performing a 3D semantic segmentation by associating each 2D object mask with a respective cluster of points in the 3D data, using the mapping index; and
outputting a set of 3D object masks.

12. The method of claim 10, further comprising:
performing a 3D regression, using a 3D regression network, that is trained to regress parameters of a 3D bounding box corresponding to subset of the data points in the set of one or more arrays, to generate output a set of 3D object bounding boxes.

13. A processing unit comprising:
a processor;
one or more memories coupled to the processor, the one or more memories storing instructions which when executed by the processor cause the processing unit to:
receive a set of 3D data in the form of a point cloud;
encode the 3D data to a set of arrays, the encoding including projecting data points in the set of 3D data onto a common 2D image plane by, for each point of the 3D data:
projecting 3D coordinates of the point onto the 2D image plane to determine a projected 2D index, the 2D image plane being defined by a set of defined virtual camera parameters, the set of virtual camera parameters including a camera projection matrix defining the 2D image plane; and
storing each 3D coordinate of the point in a respective array of the set of arrays at the projected 2D index; and
output the set of arrays for input to a 2D convolutional neural network (CNN) configured to perform object detection on the set of arrays during training or inference.

14. The processing unit claim 13, wherein the one or more memories store further instructions which when executed by the processor cause the processing unit to:
adjust the 3D data according to one or more predefined parameters to generate a set of adjusted 3D data;
wherein the 3D data is adjusted by performing at least one of: scaling, shifting, normalizing or quantizing the 3D coordinates; and
wherein the set of arrays is generated from the adjusted 3D data.

15. The processing unit of claim 13, wherein the adjusted 3D data contains values adjusted to be recognizable as image data.

16. The processing unit of claim 13, wherein the virtual camera parameters include a definition of a region of interest (ROI), and wherein the processing unit is further configured to implement the data analysis system to:
define a subset of the 3D data corresponding to the ROI; and
encode the set of arrays from the subset of the 3D data.

17. The processing unit of claim 13, wherein the one or more memories store further instructions which when executed by the processor cause the processing unit to fill in any holes in the set of arrays using dilation.

18. The processing unit of claim 13, wherein the one or more memories store further instructions which when executed by the processor cause the processing unit to:
- encode the set of 3D data to a second set of arrays, the encoding including projecting data points in the set of 3D data onto a common second 2D image plane, using a second set of virtual camera parameters defining a second 2D image plane.

19. The processing unit of claim 18, wherein a mapping index is stored to map each calculated projected 2D index to the respective point in the 3D data, wherein the one or more memories store further instructions which when executed by the processor cause the processing unit to:
- perform a 3D semantic segmentation by associating each 2D object mask with a respective cluster of points in the 3D data, using the mapping index; and
- output a set of 3D object masks.

20. The processing unit of claim 13, wherein the one or more memories store further instructions which when executed by the processor cause the processing unit to:
- input the set of arrays to the 2D CNN configured to perform object detection, the 2D CNN detecting objects in the set of arrays and outputting a feature array associated with each detected object; and
- perform 2D bounding box generation on the feature array associated with each detected object to generate a 2D object bounding box for each detected object and perform 2D object segmentation on the feature array associated with each detected object to generate a 2D object for each detected object.

21. The processing unit of claim 13, wherein the one or more memories store further instructions which when executed by the processor cause the processing unit to:
- combine the set of arrays with a set of 2D image data obtained by the optical camera, to generate a set of combined data;
- input the set of combined data to the 2D CNN configured to perform object detection, the 2D CNN detecting objects in the set of combined data and outputting a feature array associated with each detected object; and
- perform 2D bounding box generation on the feature array associated with each detected object to generate a 2D object bounding and 2D object segmentation on the feature array associated with each detected object to generate a 2D object for each detected object.

* * * * *